(12) United States Patent
Kai

(10) Patent No.: US 12,224,606 B2
(45) Date of Patent: Feb. 11, 2025

(54) CONTROL APPARATUS AND CONTROL METHOD

(71) Applicant: SONY GROUP CORPORATION, Tokyo (JP)

(72) Inventor: Toshimitsu Kai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 11 days.

(21) Appl. No.: 17/915,853

(22) PCT Filed: Mar. 30, 2021

(86) PCT No.: PCT/JP2021/013732
§ 371 (c)(1),
(2) Date: Sep. 29, 2022

(87) PCT Pub. No.: WO2021/205949
PCT Pub. Date: Oct. 14, 2021

(65) Prior Publication Data
US 2023/0170713 A1 Jun. 1, 2023

(30) Foreign Application Priority Data

Apr. 10, 2020 (JP) ................. 2020-070777

(51) Int. Cl.
*H02J 7/00* (2006.01)
*H02J 1/00* (2006.01)
(Continued)

(52) U.S. Cl.
CPC .......... *H02J 7/00304* (2020.01); *H02J 1/001* (2020.01); *H02J 1/10* (2013.01); *H02J 7/0047* (2013.01); *H02J 7/00712* (2020.01); *H02J 7/345* (2013.01)

(58) Field of Classification Search
CPC .......... H02J 7/00304; H02J 1/001; H02J 1/10; H02J 7/0047; H02J 7/00712; H02J 7/345;
(Continued)

(56) References Cited

U.S. PATENT DOCUMENTS

| | | | |
|---|---|---|---|
| 5,930,130 A * | 7/1999 | Katyl ...................... | H02M 7/06 323/908 |
| 2014/0009134 A1* | 1/2014 | Bernardon .............. | H02M 1/36 323/284 |

(Continued)

FOREIGN PATENT DOCUMENTS

| | | | | |
|---|---|---|---|---|
| EP | 2400649 A1 * | 12/2011 | ............. | H02M 1/36 |
| JP | 2005-065459 A | 3/2005 | | |

(Continued)

OTHER PUBLICATIONS

International Search Report and Written Opinion of PCT Application No. PCT/JP2021/013732, issued on Jun. 8, 2021, 08 pages of ISRWO.

*Primary Examiner* — Jared Fureman
*Assistant Examiner* — Michael J Warmflash
(74) *Attorney, Agent, or Firm* — CHIP LAW GROUP

(57) ABSTRACT

An object of the present technique is to favorably prevent an excess current upon initial charging of a capacitor for assisting power supply. A control unit is provided that controls a power system in which a power supply is connected to a load via a power supply line, a capacitor for assisting power supply is connected to the power supply line via a first switch, and the capacitor is configured to be charged while being subjected to current limitation due to intermittent driving by a switching power supply using the power supply as input. The control unit is configured to control the switching power supply so that an output voltage thereof becomes equal to a voltage of the power supply line and to control the first switch from an off-state to an on-state (Continued)

after charging of the capacitor is completed to connect the capacitor to the power supply line.

14 Claims, 11 Drawing Sheets

(51) Int. Cl.
*H02J 1/10* (2006.01)
*H02J 7/34* (2006.01)

(58) Field of Classification Search
CPC ............. H02J 7/0025; H02J 7/00714; H02J 7/007182; H02H 1/043; H02H 7/16; H02H 9/001
See application file for complete search history.

(56) References Cited

U.S. PATENT DOCUMENTS

| | | | | |
|---|---|---|---|---|
| 2015/0380985 | A1* | 12/2015 | Lecourtier | ............... G06F 1/30 713/300 |
| 2019/0245438 | A1* | 8/2019 | Ikegaya | .................. H02J 3/14 |
| 2021/0135471 | A1* | 5/2021 | Hanson | ............ H02M 3/33523 |

FOREIGN PATENT DOCUMENTS

| | | | |
|---|---|---|---|
| JP | 2008-118828 | A | 5/2008 |
| JP | 2014-135825 | A | 7/2014 |
| JP | 2018-182936 | A | 11/2018 |

\* cited by examiner

CONTROL APPARATUS AND CONTROL METHOD

CROSS REFERENCE TO RELATED APPLICATIONS

This application is a U.S. National Phase of International Patent Application No. PCT/JP2021/013732 filed on Mar. 30, 2021, which claims priority benefit of Japanese Patent Application No. JP 2020-070777 filed in the Japan Patent Office on Apr. 10, 2020. Each of the above-referenced applications is hereby incorporated herein by reference in its entirety.

TECHNICAL FIELD

The present technique relates to a control apparatus and a control method and, particularly, to a control apparatus and the like which control a power system to be used by connecting, to a power supply line, a capacitor for assisting power supply.

BACKGROUND ART

For example, in a robot that performs a powerful operation, an instantaneous power supply capacity of a battery may become insufficient. Attempting to solve a shortage of the instantaneous power supply capacity of a battery with the battery alone generally tends to cause an increase in size and worsening of degradation characteristics of the battery. In this case, the worsening of degradation characteristics gives rise to a problem of increased maintenance cost. In a mobile robot, an increased battery size gives rise to problems such as an increase in body size, an increase in body weight, and an increase in power consumption (a reduction in operation time) due to the increase in body weight.

In order to suppress an increase in body size and an increase in body weight, a method is sometimes used in which a power supply auxiliary circuit having a large-capacitance capacitor with superior instantaneous power output characteristics such as an EDLC (Electric Double Layer Capacitor) being connected in parallel to a battery is constructed in order to assist power supply of the battery. With this method, when a load is a motor and regenerative energy is to return, there is also an advantage in that the regenerative energy can be recovered by the capacitor due to a power supply line and the capacitor being directly connected to each other.

However, when constructing such a power supply auxiliary circuit, an inrush current in accordance to a potential difference between the capacitor and the power supply line when directly connecting the capacitor and the power supply line to each other often becomes an issue. Specifically, since the capacitance of the capacitor is large, a large inrush current (capacitor charge current) flows when the capacitor is directly connected to the power supply line and problems such as generation of sparks, destruction of circuit elements, and instantaneous interruption and/or malfunction of a system as a whole due to detection of an overcurrent of the power supply may occur.

For example, PTL 1 discloses using a current-limiting resistor to prevent an excess current upon initial charging of a capacitor. In this case, a power supply line and the capacitor are connected to each other via the resistor, and a voltage level can also be adjusted while suppressing an inrush current.

CITATION LIST

Patent Literature

[PTL 1]
JP 2008-118828 A

SUMMARY

Technical Problem

With a technique for preventing an excess current upon initial charging of a capacitor using a current-limiting resistor, since a large heat loss occurs in the resistor in high-voltage and high-capacitance applications intended for robots, a resistor with a large permissible loss rating is to be used, thereby creating a disadvantage of increasing a size of a resistive element. In addition, depending on the application, the resistor requires a cooling mechanism which may lead to a further increase in body size. Furthermore, charging using a resistor is also disadvantageous in that, as charging of a capacitor progresses, a charge current is reduced and results in extending charge time.

An object of the present technique is to favorably prevent an excess current upon initial charging of a capacitor for assisting power supply.

Solution to Problem

A concept of the present technique is represented by a control apparatus, including:
  a control unit configured to control a power system in which a power supply is connected to a load via a power supply line, a capacitor for assisting power supply is connected to the power supply line via a first switch, and the capacitor is configured to be charged while being subjected to current limitation due to intermittent driving by a switching power supply that uses the power supply as input, wherein
  the control unit is configured to control the switching power supply so that an output voltage thereof becomes equal to a voltage of the power supply line and to control the first switch from an off-state to an on-state after charging of the capacitor is completed.

In the present technique, a control unit is provided which is configured to control a power system in which a power supply is connected to a load via a power supply line, a capacitor for assisting power supply is connected to the power supply line via a first switch, and the capacitor is configured to be charged while being subjected to current limitation due to intermittent driving by a switching power supply that uses the power supply as input. For example, the power supply may be a battery. In addition, for example, the capacitor may be an EDLC (Electric Double Layer Capacitor). Furthermore, for example, the load may include a motor constituting a robot. The control unit is configured to control the switching power supply so that an output voltage thereof becomes equal to a voltage of the power supply line and to control the first switch from an off-state to an on-state after charging of the capacitor is completed.

As described above, in the present technique, a capacitor is charged while being subjected to current limitation due to intermittent driving by a switching power supply that uses a power supply as input and, unlike a method using a current-limiting resistor, heat loss can be significantly reduced, and since a cooling mechanism for a charge circuit is no longer required or a small and light-weight cooling mechanism will suffice, a size and a weight of a robot can be reduced and an operation time of the robot can be extended. In addition, in the present technique, unlike a method using a current-limiting resistor, since a current is not reduced even when charging progresses, a charge time can be significantly shortened.

In addition, in the present technique, since the switching power supply is controlled so that an output voltage thereof becomes equal to a voltage of the power supply line and the first switch is controlled from an off-state to an on-state after charging of the capacitor is completed, an occurrence of an inrush current in accordance to a potential difference when connecting the capacitor to the power supply line after charging is completed can be suppressed, the capacitor can be safely connected to the power supply line, and regenerative energy that is generated by the load can be favorably recovered.

In the present technique, for example, the power system may have a second switch between the switching power supply and the capacitor, and the control unit may be configured to control the second switch from an off-state to an on-state when starting charging of the capacitor by the switching power supply and to control the second switch from an on-state to an off-state when charging of the capacitor is completed. Accordingly, when starting charging of the capacitor by the switching power supply, the charging can be started by connecting the switching power supply to the capacitor and, on the other hand, once the charging of the capacitor is completed, the capacitor can be disconnected from the switching power supply to prevent a countercurrent from the capacitor to the switching power supply.

In this case, for example, the control unit may be configured to, when starting the charging of the capacitor by the switching power supply, control output of the switching power supply from an off-state to an on-state after controlling the second switch from an off-state to an on-state. Accordingly, the second switch can be prevented from becoming damaged due to applied stress. In addition, in this case, for example, the control unit may be configured to, when the charging of the capacitor is completed, control output of the switching power supply from an on-state to an off-state after controlling the second switch from an on-state to an off-state. Accordingly, a countercurrent from the capacitor to the switching power supply can be reliably prevented.

In addition, for example, the power system may have a first voltage detecting unit configured to detect a voltage of the power supply line, and the control unit may be configured to control the switching power supply so that an output voltage thereof becomes equal to the voltage of the power supply line based on a detection result of the first voltage detecting unit. In this case, for example, the power system may have a current converter configured to input or output a current to or from a feedback line of the switching power supply, and the control unit may be configured to calculate a current operation amount of a feedback line of the first switching power supply based on a detection result of the first voltage detecting unit and to instruct the current converter to input or output the current operation amount to or from the feedback line. Accordingly, the output voltage of the switching power supply can be appropriately controlled so as to equal the voltage of the power supply line.

Furthermore, in the present technique, for example, the power system may have a second voltage detecting unit configured to detect a charge voltage of the capacitor, and the control unit may be configured to determine whether or not charging of the capacitor has been completed based on a detection result of the second voltage detecting unit. Accordingly, completion of charging of the capacitor can be more accurately determined.

In addition, in the present technique, for example, the power system may have a third switch between the power supply line and the switching power supply, and the control unit may be configured to, when starting charging of the capacitor by the switching power supply, control the third switch from an off-state to an on-state, and when the charging of the capacitor is completed, control the third switch from an on-state to an off-state. Accordingly, when starting the charging of the capacitor by the switching power supply, power can be input to the switching power supply from the power supply line and, on the other hand, when the charging of the capacitor is completed, the power supply line can be disconnected from the switching power supply.

Furthermore, in the present technique, for example, the power system may have a hot-swap circuit configured to perform hot-swapping of switching from a state where a first power supply is connected to the power supply line as a power supply to a state where a second power supply is connected to the power supply line as a power supply or to a state where the first power supply and the second power supply are connected in parallel, and the control unit may be configured to, when hot-swapping is performed with the hot-swap circuit, control the hot-swap circuit to actually perform hot-swapping after controlling the first switch from an on-state to an off-state, control the capacitor to be charged while being subjected to current limitation due to intermittent driving by the switching power supply, and control the first switch from an off-state to an on-state after charging of the capacitor is completed. Accordingly, when performing hot-swapping, an inrush current (capacitor charge current) in accordance with a potential difference can be prevented from flowing from the power supply line to the capacitor.

In addition, in the present technique, the control unit may be configured to control the first switch from an on-state to an off-state when the load does not require power supply assistance by the capacitor, control the capacitor to be charged while being subjected to current limitation due to intermittent driving by the switching power supply when the load requires power supply assistance by the capacitor, and control the first switch from an off-state to an on-state after charging of the capacitor is completed. Accordingly, since a capacitor-charging state at a timing where power supply assistance is not required can be avoided, power loss due to leakage of the capacitor can be reduced and a service life of the capacitor itself can be extended.

Furthermore, in the present technique, the power system may have a fourth switch configured to connect the power supply to the power supply line and a discharge circuit configured to discharge an electric charge of the capacitor, and the control unit may be configured to, when an abnormality occurs in the load, control the fourth switch from an on-state to an off-state, control the first switch from an on-state to an off-state, and control the discharge circuit to discharge the electric charge of the capacitor. Accordingly, safety when some kind of an abnormality occurs in the load such as a robot can be secured and a decline in the service life of the capacitor due to unintentionally maintaining a charged state of the capacitor can be avoided.

In this case, for example, the control unit may be supplied power from the power supply via the power supply line and power from the capacitor in parallel. Accordingly, even when the power supply is disconnected from the power supply line and a state of power loss is created, the control unit can activate the discharge circuit using power from the capacitor and discharge the electric charge of the capacitor in a safe manner.

DESCRIPTION OF EMBODIMENTS

Figure 1:
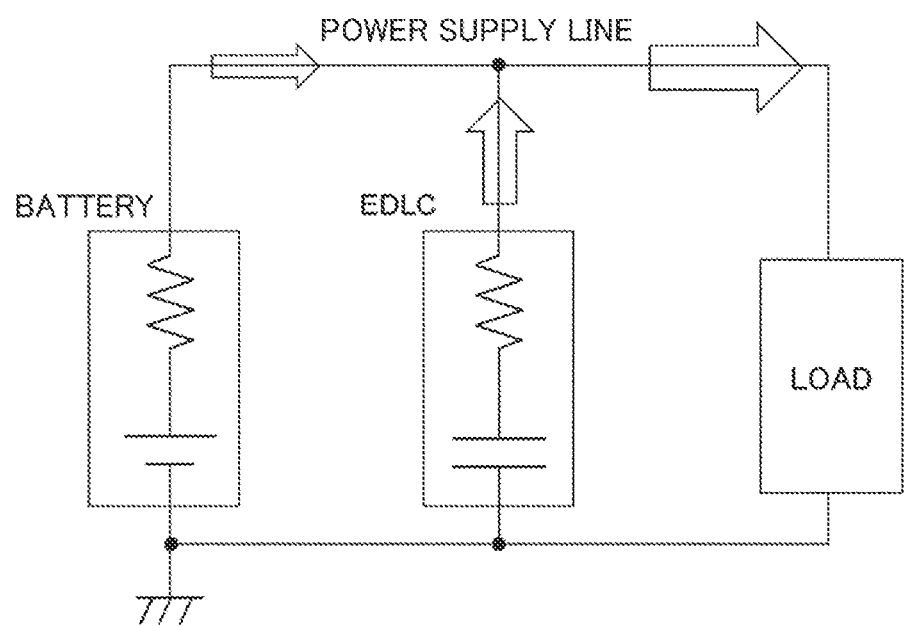
FIG. 1 is a diagram presenting an overview of a power supply system having a capacitor for assisting power supply to a power system.

Modes for carrying out the present invention (hereinafter referred to as "embodiments") will be described hereinafter. The descriptions will be given in the following order.
1. First Embodiment
2. Second Embodiment
3. Third Embodiment
4. Third Embodiment
5. Modifications 1. First Embodiment "Overview of power supply system having a capacitor for assisting power supply" FIG. 1 presents an overview of a power supply system having a capacitor for assisting power supply to a power system. A battery as a power supply is connected to a load via a power supply line. For example, the load includes a motor constituting a robot. A capacitor for assisting power supply is connected to the power supply line. The capacitor has a large capacitance and is herein assumed to be an EDLC (Electric Double Layer Capacitor).

In the power supply system, when power required by the load instantaneously increases, the load is preferentially supplied power from the capacitor. In the illustrated example, a width of an arrow schematically indicates a current amount flowing through each line when the power required by the load instantaneously increases. As described above, having a capacitor for assisting power supply to a power system enables an increase in battery size to be avoided and, for example, enables increases in a body size and a body weight of a robot to be avoided.

Configuration Example of Power Supply System

Figure 2:
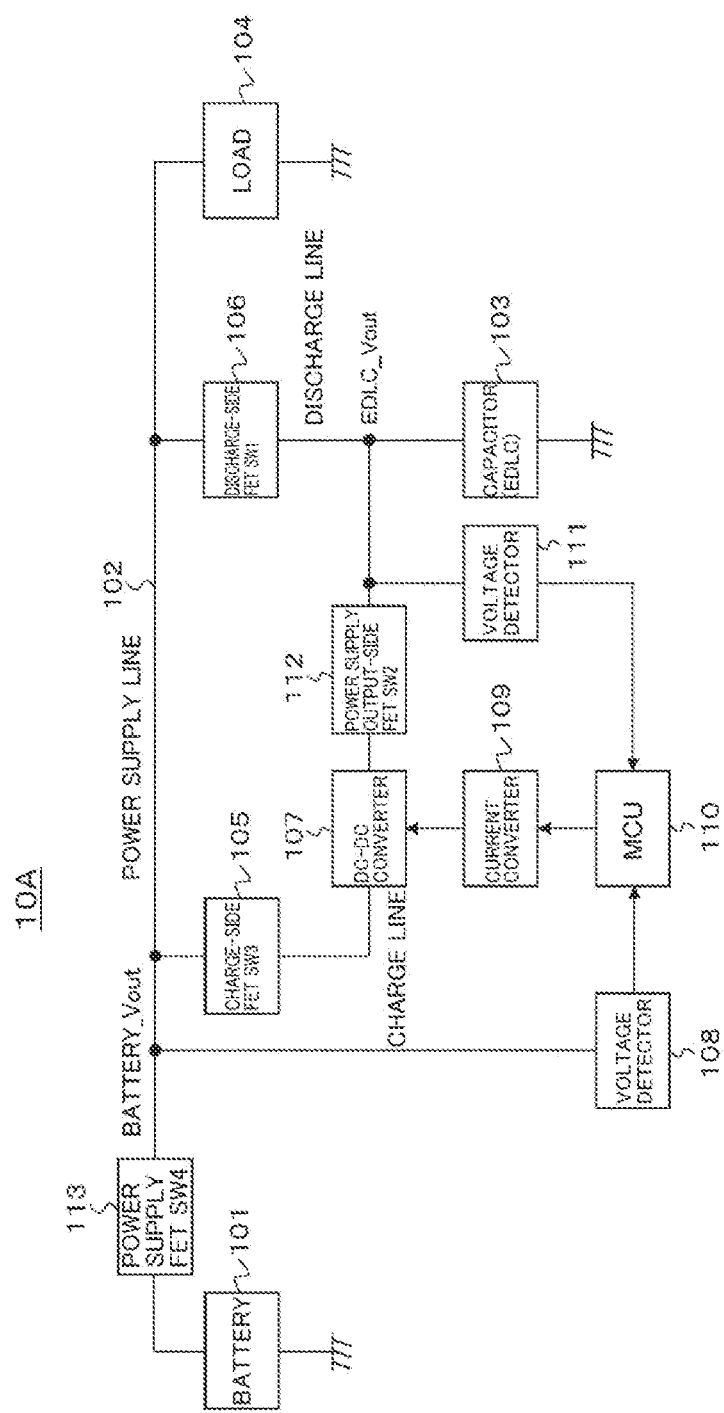
FIG. 2 is a block diagram showing a configuration example of a power supply system as a first embodiment.

FIG. 2 shows a configuration example of a power supply system 10A as a first embodiment. The power supply system 10A includes a battery 101, a power supply line 102, a capacitor (EDLC) 103, a load 104, a charge-side FET switch (a charge-side FET SW3) 105, a discharge-side FET switch (a discharge-side FET SW1) 106, a DC-DC converter 107, a voltage detector 108, a current converter 109, an MCU (Micro Controller Unit) 110 constituting the control unit, a voltage detector 111, a switching power supply output-side FET switch (a SW power supply output-side FET SW2) 112, and a power supply FET switch (a power supply FET SW4) 113.

The battery 101 is connected to the load 104 via the power supply line 102 and supplies power to the load 104. In the present embodiment, the battery 101 constitutes a main power supply of a robot. In the case of a mobile robot, a battery is often used as a power supply. There is a limit to a supply capacity of a battery, and batteries with a high supply capacity tend to have larger sizes. The power supply FET switch 113 is a switch for connecting the battery 101 to the power supply line 102.

The capacitor 103 is a power storage device which assists power supply to the load 104 by being connected in parallel to the battery 101. The capacitor 103 is connected to the power supply line 102 via the discharge-side FET switch 106. In the present embodiment, the capacitor 103 is an EDLC (Electric Double Layer Capacitor).

An EDLC is a capacitor of which a capacitance is small when compared to a battery but the capacitance is exponentially large when compared to a conventional capacitor (such as an aluminum electrolytic capacitor). In addition, an EDLC has a high power supply capacity when compared to a battery and is a device optimized for assisting supply of large instantaneous power to a robot. Generally, a plurality of EDLCs are connected in series (to achieve a higher breakdown voltage as a module) in accordance with a power supply voltage of a robot and, at the same time, a plurality of EDLCs are connected in parallel (to improve capacitance and supply capacity as a module) in accordance with large instantaneous power of the robot.

In this case, the load 104 is a power-consuming device which is necessary for operating the robot and which is a CPU (Central Processing Unit), a motor, or the like. A device with largest power consumption among loads in a robot is often a motor. When the load 104 is a motor, the robot tends to require large instantaneous power when performing a powerful operation.

In addition, when the load 104 is a motor and the motor performs a regenerative operation, regenerative energy may return (flow back) to the power supply line 102 from a motor side (a load side). When the battery 101 and the capacitor 103 are compared with each other, the capacitor 103 is superior in terms of a function of inputting and outputting instantaneous power. Therefore, when regenerative energy returns to the power supply line 102, the regenerative energy is more readily absorbed by the capacitor 103 than the battery 101.

The charge-side FET switch 105 is a switch that controls conduction of a charge line of the capacitor 103. The charge-side FET switch 105 is interposed between the power supply line 102 and the DC-DC converter 107.

When starting charging of the capacitor 103 by the DC-DC converter 107, the charge-side FET switch 105 is switched from an off-state to an on-state and a power supply voltage is input to the DC-DC converter 107 from the power supply line 102. In addition, when charging of the capacitor 103 is completed, the charge-side FET switch 105 is switched from an on-state to an off-state and the power supply line 102 is disconnected from the DC-DC converter 107.

While the switch may be a mechanical switch, generally, an electronic switch using a FET is used. When conduction of the charge line can be controlled by switching the DC-DC converter 107 to an on-state and an off-state, the charge-side FET switch 105 can be omitted.

The discharge-side FET switch 106 is a switch that controls conduction of a discharge line of the capacitor 103. The discharge-side FET switch 106 is interposed between the capacitor 103 and the power supply line 102. While the switch may be a mechanical switch, since a gentle connection to the power supply line 102 or, in other words, a so-called soft-on is often required, a FET switch of which a transition time from an off-state to an on-state is readily controlled is preferable. When there is a potential difference between a charge voltage of the capacitor 103 and a voltage of the power supply line 102, while a current that flows when a connection is made to the potential difference creates power loss and applies stress to the discharge-side FET switch 106, the stress can be suppressed by the soft-on.

In addition, the discharge-side FET switch 106 is required to have low impedance in order to maximize the performance of the capacitor 103 in assisting power supply. Furthermore, from the perspective of recovery of regenerative energy when the load 104 is a motor, the discharge-side FET switch 106 must enable currents to flow in both directions when switched to an on-state. In other words, substituting the discharge-side FET switch 106 with a rectifying element using a diode or the like prevents regenerative energy from being recovered and is therefore undesirable. Since the absence of the discharge-side FET switch 106 creates a charge current (an inrush current) to the capacitor 103 via the discharge line, the discharge-side FET switch 106 is a requisite.

The DC-DC converter 107 constitutes a switching power supply for charging the capacitor 103. The DC-DC converter 107 is capable of limiting output current. The capacitor 103 is charged while being subjected to current limitation due to intermittent driving by the DC-DC converter 107.

The voltage detector 108 detects a voltage of the power supply line 102 or, in other words, a voltage (battery_Vout) of the battery 101 and sends a detection result (a detected value) thereof to the MCU 110. The current converter 109 inputs and outputs a current (a current operation amount) to and from a feedback line (not illustrated) of the DC-DC converter 107 in accordance with an instruction by a command value from the MCU 110. Accordingly, a current of the feedback line of the DC-DC converter 107 is adjusted and an output voltage of the DC-DC converter 107 is adjusted so as to equal the voltage of the power supply line 102. Accordingly, the output voltage of the DC-DC converter 107 is appropriately adjusted so as to equal the voltage of the power supply line 102.

In this case, a regulator circuit group of the output voltage of the DC-DC converter 107 is constituted of the voltage detector 108, the MCU 110, and the current converter 109. Alternatively, the DC-DC converter 107 itself may be equipped with the function of the regulator circuit group. In such a case, the voltage detector 108 and the current converter 109 are no longer required.

The MCU 110 receives a detection result (a detected value) from the voltage detector 108 and, based on the detection result, calculates a current operation amount necessary for adjusting the output voltage of the DC-DC converter 107 so as to equal the voltage of the power supply line 102. In addition, the MCU 110 sends, to the current converter 109, a command value for instructing the current operation amount to be input and output to and from the feedback line of the DC-DC converter 107.

In addition, the MCU 110 monitors and manages on/off-states of each FET switch constituting the power supply system 10A, start and stop of the DC-DC converter 107, charge and discharge levels of the capacitor 103, and the like.

The voltage detector 111 detects a charge voltage (EDLC_Vout) of the capacitor 103 and sends a detection result (a detected value) thereof to the MCU 110. While the MCU 110 can determine a completion of charging of the capacitor 103 based on time from start of charging, the completion of charging of the capacitor 103 can be more accurately determined by basing the determination on the detection result from the voltage detector 111.

The switching power supply output-side FET switch 112 is a switch for preventing a current from flowing back to the DC-DC converter 107 from the capacitor 103. The switching power supply output-side FET switch 112 is interposed between the DC-DC converter 107 and the capacitor 103.

Charging of the capacitor by the DC-DC converter 107 is started by switching the switching power supply output-side FET switch 112 from an off-state to an on-state and connecting the DC-DC converter 107 to the capacitor 103. In addition, when charging of the capacitor 103 is completed, the switching power supply output-side FET switch 112 is switched from an on-state to an off-state, the capacitor 103 is disconnected from the DC-DC converter 107, and a countercurrent from the capacitor 103 to the DC-DC converter 107 is prevented.

In this case, when starting the charging of the capacitor 103 by the DC-DC converter 107, output of the DC-DC converter 107 is switched from an off-state to an on-state after the switching power supply output-side FET switch 112 is switched from an off-state to an on-state. Accordingly, the switching power supply output-side FET switch 112 is prevented from becoming damaged due to applied stress. In addition, in this case, when the charging of the capacitor 103 is completed, the output of the DC-DC converter 107 is switched from an on-state to an off-state after the switching power supply output-side FET switch 112 is switched from an on-state to an off-state. Accordingly, a countercurrent from the capacitor 103 to the DC-DC converter 107 is reliably prevented.

Figure 3:
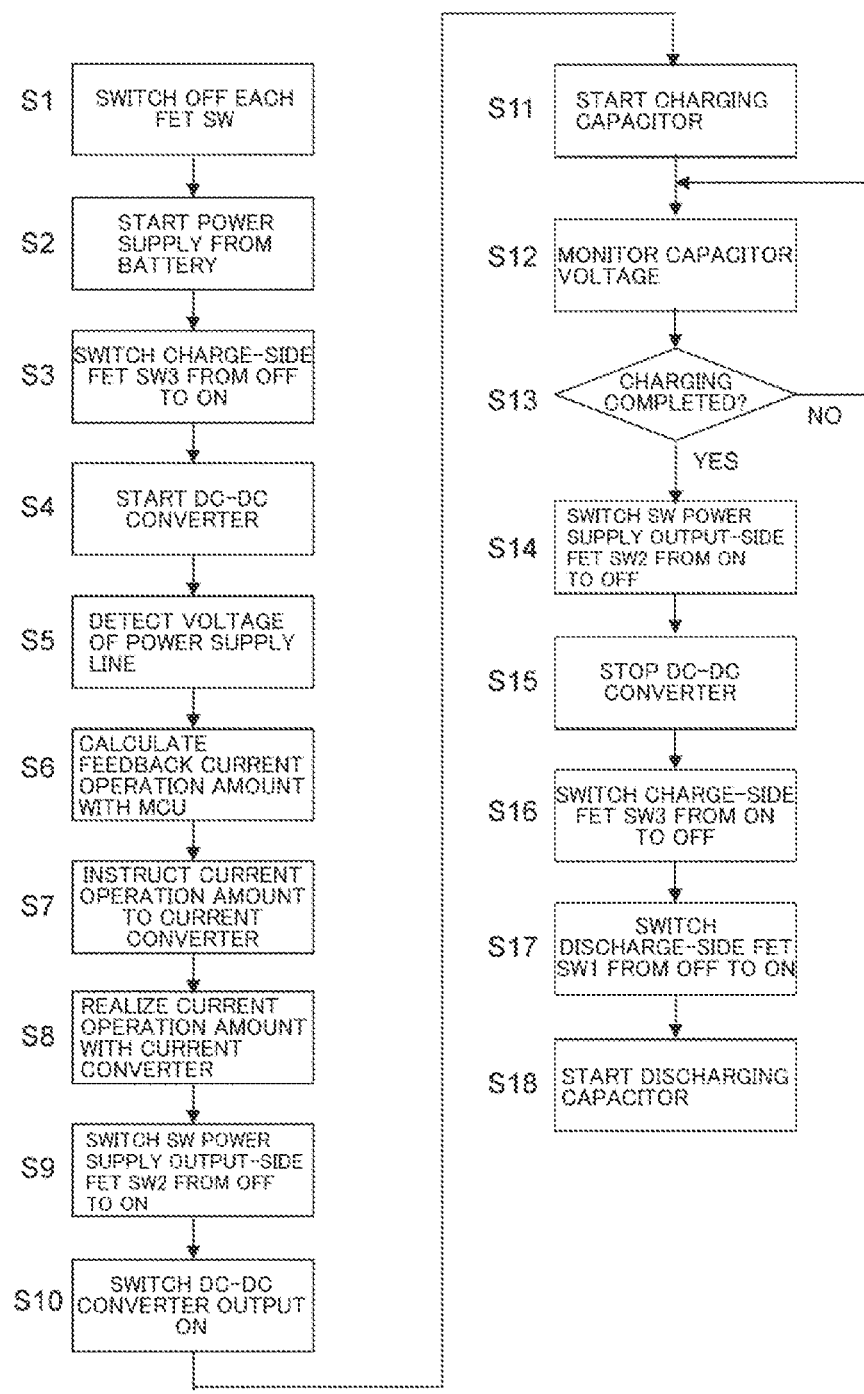
FIG. 3 is a flowchart showing an example of an operation of a power supply system.

The flowchart in FIG. 3 shows an example of an operation of the power supply system 10A shown in FIG. 2. First, in step S1, an initial state of each FET switch is set to an off-state. Next, in step S2, the power supply FET switch 113 is switched from an off-state to an on-state and power supply from the battery 101 is started. In this case, a voltage (battery_Vout) of the power supply line 102 differs depending on specifications and a charge level of the battery 101.

Next, in step S3, the charge-side FET switch 105 is switched from an off-state to an on-state. In this case, a power supply voltage is input to the DC-DC converter 107 from the power supply line 102. Next, in step S4, the DC-DC converter 107 is activated. At this point, the DC-DC converter 107 has not started switching and output is set to an off-state.

Next, in step S5, the voltage detector 108 detects the voltage of the power supply line 102. A detection result (a detected value) thereof is sent to the MCU 110. Next, in step S6, based on the detection result of the voltage of the power supply line 102, the MCU 110 calculates a current operation amount of the feedback line of the DC-DC converter 107 for making the output voltage of the DC-DC converter 107 equal to the voltage of the power supply line 102. In this case, a calculation formula varies depending on a feedback specification of the DC-DC converter 107.

Next, in step S7, a command value for instructing the calculated current operation amount to be input and output to and from the feedback line of the DC-DC converter 107 is sent from the MCU 110 to the current converter 109. Next, in step S8, at the current converter 109, input and output of a current (the current operation amount) to and from the feedback line of the DC-DC converter 109 are realized. Accordingly, the DC-DC converter 107 is adjusted so that the output voltage thereof becomes equal to the voltage of the power supply line 102.

Next, in step S9, the switching power supply output-side switch 112 is switched from an off-state to an on-state. In this case, the DC-DC converter 107 is connected to the capacitor 103. Next, in step S10, the DC-DC converter 107 is set to output-on. In addition, in step S11, charging is started at the capacitor 103. As described above, since the DC-DC converter 107 is set to output-on after the switching power supply output-side FET switch 112 is switched from an off-state to an on-state when starting charging of the capacitor 103, the switching power supply output-side FET switch 112 can be prevented from becoming damaged due to applied stress.

Next, in step ST12, the MCU 110 monitors a charge voltage (EDLC_Vout) of the capacitor 103. In this case, the charge voltage (EDLC_Vout) of the capacitor 103 is detected by the voltage detector 111 and a detection result (a detected value) thereof is sent to the MCU 110. In addition, in step S13, the MCU 110 determines whether or not charging has been completed. In this case, a determination that charging has been completed is made when the charge voltage (EDLC_Vout) of the capacitor 103 becomes approximately equal to the voltage (battery_Vout) of the power supply line 102 such as when the charge voltage of the capacitor 103 reaches 95% of the voltage of the power supply line 102.

When it is determined that charging has not been completed, a return is made to step S12 to continue charging of the capacitor 103. On the other hand, when it is determined that charging has been completed, the operation advances to step S14. In step S14, the switching power supply output-side FET switch 112 is switched from an on-state to an off-state. Accordingly, the capacitor 103 is disconnected from the DC-DC converter 107 and a countercurrent from the capacitor 103 to the DC-DC converter 107 is prevented.

Next, in step S15, the DC-DC converter 107 is placed in a stopped state. In this case, the stopped state refers to an output-off state or a state prior to activation. As described above, by placing the DC-DC converter 107 in a stopped state after switching the switching power supply output-side FET switch 112 from an on-state to an off-state, a countercurrent from the capacitor 103 to the DC-DC converter 107 is reliably prevented. Specifically, some DC-DC converters 107 absorb a current from an output side in a stopped state, and when using such a DC-DC converter 107, the capacitor 103 must be disconnected from the DC-DC converter 107 before placing the DC-DC converter 107 in the stopped state.

Next, in step S16, the charge-side FET switch 105 is switched from an on-state to an off-state. Accordingly, the DC-DC converter 107 is disconnected from the power supply line 102 and disconnection of a charge-side circuit is completed. Next, in step S17, the discharge-side FET switch 106 is switched from an off-state to an on-state. Accordingly, the capacitor 103 is connected to the power supply line 102.

Next, in step S18, the capacitor 103 enters a discharge start state (a power suppliable state). Accordingly, power can be supplied to the load 104 from both the battery 101 and the capacitor 103. In addition, when the load 104 is a motor and regenerative energy is returned, the regenerative energy can be recovered by the capacitor 103.

As described above, in the power supply system 10A shown in FIG. 2, the capacitor 103 is charged while being subjected to current limitation due to intermittent driving of the DC-DC converter 107 which uses the battery 101 as input. Therefore, unlike a method using a current-limiting resistor, heat loss can be significantly reduced, and since a cooling mechanism for a charge circuit is no longer required or a small and light-weight cooling mechanism will suffice, a size and a weight of a robot can be reduced and an operation time of the robot can be extended. Unlike a method using a current-limiting resistor, since a current is not reduced even when charging progresses, a charge time can be significantly shortened.

Figure 4:
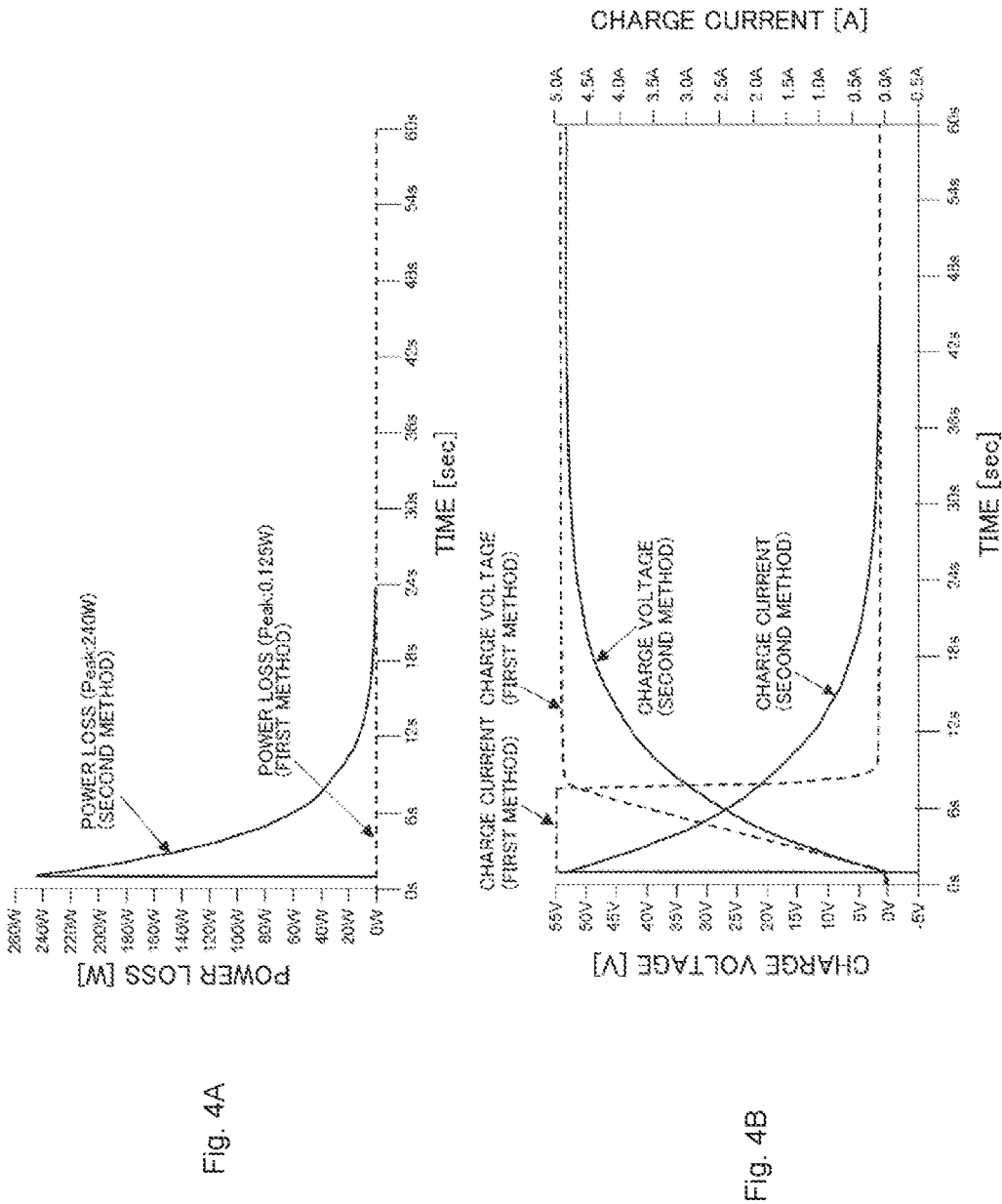
FIGS. 4A and 4B are diagrams showing, by comparison, transitions in power loss, charge current, and charge voltage in a case (a first method) where a capacitor is charged while being subjected to current limitation due to intermittent driving by a DC-DC converter and a case (a second method) where the capacitor is charged using a current-limiting resistor.

FIG. 4A shows an example of a transition in power loss in a case (a first method) where a capacitor is charged while being subjected to current limitation due to intermittent driving by the DC-DC converter 107 as in the present technique and a case (a second method) where the capacitor is charged using a current-limiting resistor. In the case of the second method, since a large charge current flows via a resistor immediately after charging is started, a large power loss is created, and since the charge current of the capacitor subsequently decreases with the charging of the capacitor, power loss also decreases. By comparison, in the case of the first method, power loss remains at a low level from immediately after the start of charging.

In addition, FIG. 4B shows an example of transitions in charge current and charge voltage in the first method and the second method. In the case of the second method, the charge current increases immediately after the start of charging and subsequently decreases as charging progresses while the charge voltage gradually increases from immediately after the start of charging, but since the charge current subsequently decreases as charging progresses, a time until charging is completed increases. By comparison, in the case of the first method, the charge current increases immediately after the start of charging and remains in the increased state, the charge voltage linearly rises from immediately after the start of charging, and charging is completed within a relatively short period of time.

In addition, in the power supply system 10A shown in FIG. 2, the output voltage of the DC-DC converter 107 is controlled so as to equal the voltage of the power supply line 102, and the discharge-side FET switch 106 is controlled from an off-state to an on-state after the charging of the capacitor 103 is completed. Therefore, an occurrence of an inrush current in accordance with a potential difference when connecting the capacitor 103 to the power supply line 102 after the completion of charging can be suppressed, the capacitor 103 can be safely connected to the power supply line 102, and regenerative energy that is generated in the load 104 can be recovered in a preferable manner.

In addition, in the power supply system 10A shown in FIG. 2, the switching power supply output-side FET switch 112 is provided between the DC-DC converter 107 and the capacitor 103, the switching power supply output-side FET switch 112 is controlled from an off-state to an on-state when starting charging of the capacitor 103 by the DC-DC converter 107, and the switching power supply output-side FET switch 112 is controlled from an on-state to an off-state when charging of the capacitor 103 is completed. Therefore, when starting charging of the capacitor 103 by the DC-DC converter 107, the charging can be started by connecting the DC-DC converter 107 to the capacitor 103, but on the other hand, when the charging of the capacitor 103 is completed, the capacitor 103 can be disconnected from the DC-DC converter 107 to prevent a countercurrent from the capacitor 103 to the DC-DC converter 107.

In addition, in the power supply system 10A shown in FIG. 2, when starting charging of the capacitor 103 by the DC-DC converter 107, output of the DC-DC converter 107 is controlled from an off-state to an on-state after controlling the switching power supply output-side FET switch 112 from an off-state to an on-state. Therefore, the switching power supply output-side FET switch 112 can be prevented from becoming damaged due to applied stress.

In addition, in the power supply system 10A shown in FIG. 2, when the charging of the capacitor 103 is completed, the output of the DC-DC converter 107 is controlled from an on-state to an off-state after controlling the switching power supply output-side FET switch 112 from an on-state to an off-state. Therefore, a countercurrent from the capacitor 103 to the DC-DC converter 107 can be reliably prevented.

In addition, the power supply system 10A shown in FIG. 2 includes the voltage detector 108 configured to detect a voltage of the power supply line 102, and control is performed so that the output voltage of the DC-DC converter 107 becomes equal to the voltage of the power supply line 102 based on a detection result of the voltage detector 108. Therefore, the output voltage of the DC-DC converter 107 can be appropriately controlled so as to become equal to the voltage of the power supply line 102.

In addition, the power supply system 10A shown in FIG. 2 includes the voltage detector 111 configured to detect a charge voltage of the capacitor 103, and completion of charging of the capacitor 103 is determined based on a detection result of the voltage detector 111. Therefore, the completion of charging of the capacitor 103 can be determined with greater accuracy.

In addition, in the power supply system 10A shown in FIG. 2, the charge-side FET switch 105 is provided between the power supply line 102 and the DC-DC converter 107, the charge-side FET switch 105 is controlled from an off-state to an on-state when starting charging of the capacitor 103 by the DC-DC converter 107, and the charge-side FET switch 105 is controlled from an on-state to an off-state when charging of the capacitor 103 is completed. Therefore, when starting charging of the capacitor 103 by the DC-DC converter 107, power can be input to the DC-DC converter 107 from the power supply line 102 and, on the other hand, when charging of the capacitor 103 is completed, the power supply line 102 can be disconnected from the DC-DC converter 107.

2. Second Embodiment

Since a robot operated by a battery is subject to operational constraints due to a continuous operation time, hot-swapping in which the battery is replaced while maintaining a conductive state may be performed as a method of extending the continuous operation time. Hot-swapping is also referred to as hot-line insertion/extraction or hot-line insertion.

When performing hot-swapping, a voltage of a power supply line is to rise from a low voltage of a battery with a low remaining battery level to a high voltage of a fully-charged battery. Since a capacitor prior to battery replacement is connected to the power supply line at a same voltage as the battery with a low remaining battery level, the voltage of the capacitor is also low. When a fully-charged battery is connected to the power supply line in this state, an inrush current in accordance with a potential difference is generated. Therefore, when it is detected that hot-swapping is to be performed, the capacitor must be charged once again in accordance with a battery level of the fully-charged battery.

Configuration Example of Power Supply System

Figure 5:
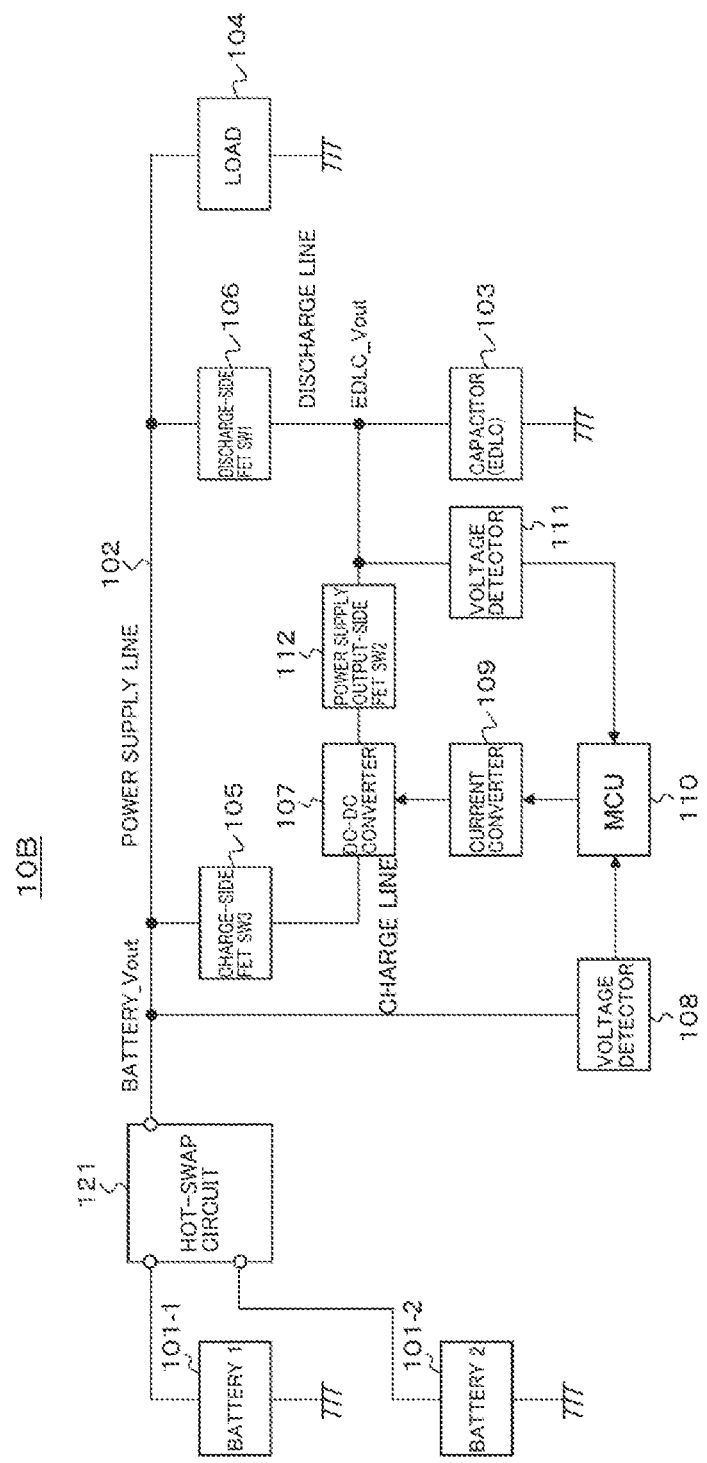
FIG. 5 is a block diagram showing a configuration example of a power supply system as a second embodiment.

FIG. 5 shows a configuration example of a power supply system 10B as a second embodiment. In FIG. 5, the parts corresponding to those in FIG. 2 are designated by the same reference signs, and detailed descriptions thereof will be omitted as appropriate. A battery 101-1 and a battery 101-2 are connected to the power supply line 102 via a hot-swap circuit 121. Other components are similar to those of the power supply system 10A shown in FIG. 2.

The battery 101-1 is a battery which has a low remaining battery level and which is to be replaced. The battery 101-2 is a fully-charged battery to be the replacement.

The hot-swap circuit 121 is a circuit configured to compare charge levels of the battery 101-1 and the battery 101-2 and to switch between connected batteries while maintaining conduction or, in other words, while maintaining power supply to the load 104. When the battery 101-2 is connected to the hot-swap circuit 121 in a state where power supply from the battery 101-1 to the load 104 is maintained through the hot-swap circuit 121, the hot-swap circuit 121 performs hot-swapping (an operation of switching between connected batteries) automatically or in accordance with an operation by a user.

In this case, a switch is made to a state where only the battery 101-2 is connected or a state where the battery 101-1 and the battery 101-2 are connected in parallel. In any case, the voltage (battery_Vout) of the power supply line 102 changes from a state where only the battery 101-1 had been connected.

In the power supply system 10B, the MCU 110 monitors the hot-swap circuit 121, and when the hot-swap circuit 121 is about to perform hot-swapping, the MCU 110 controls the discharge-side FET switch 106 from an on-state to an off-state, subsequently controls the hot-swap circuit 121 to actually perform hot-swapping, and controls the discharge-side FET switch 106 from an off-state to an on-state after the capacitor 103 has been recharged based on the voltage of the power supply line 102 after the change.

Accordingly, while the voltage (battery_Vout) of the power supply line 102 changes abruptly when hot-swapping is performed by the hot-swap circuit 121, a large inrush current (a capacitor inrush current) can be prevented from flowing from the power supply line 102 to the capacitor 103 and occurrences of problems such as generation of sparks, destruction of circuit elements, and instantaneous interruption and/or malfunction of a system as a whole due to detection of an overcurrent of the power supply can be avoided.

Figure 6:
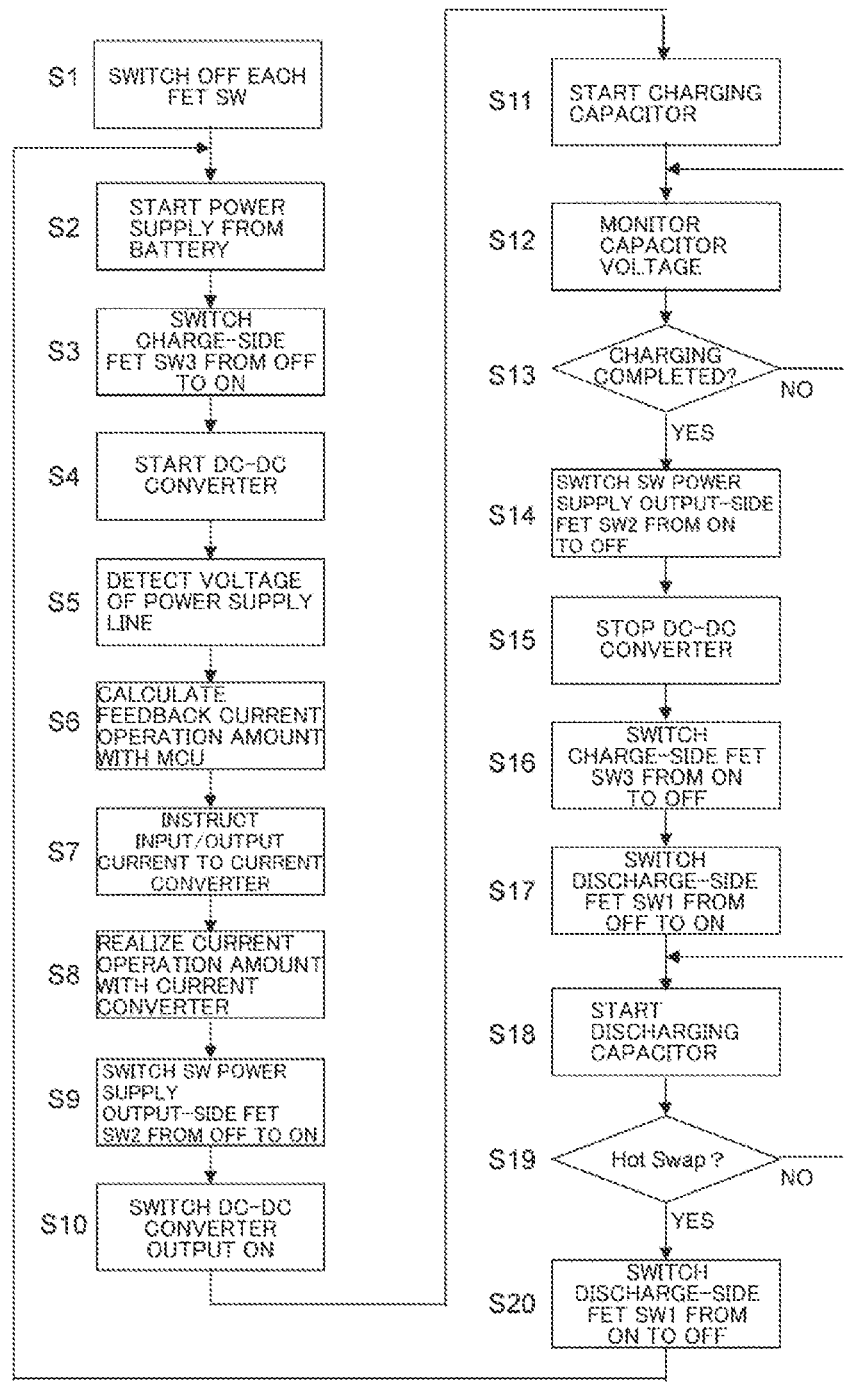
FIG. 6 is a flowchart showing an example of an operation of a power supply system.

The flowchart in FIG. 6 shows an example of an operation of the power supply system 10B shown in FIG. 5. In FIG. 6, steps corresponding to those in the flow chart shown in FIG. 3 are designated by the same reference signs and detailed descriptions thereof will be omitted as appropriate.

After the capacitor 103 enters a discharge start state (a power suppliable state) in step S18, in step S19, the MCU 110 determines whether or not the hot-swap circuit 121 is to perform hot-swapping. When it is determined that hot-swapping is not performed, a return is made to step S18 and the discharge start state (the power suppliable state) of the capacitor 103 is maintained.

On the other hand, when it is determined that hot-swapping is to be performed, in step S20, the discharge-side FET switch 106 is switched from an on-state to an off-state and the capacitor 103 is disconnected from the power supply line 102 in anticipation of a voltage change of the power supply line 102 in accordance with the hot-swapping. Thereafter, a return is made to the processing of step S2.

In present step S2, hot-swapping is actually performed by the hot-swap circuit 121 and a state where only the battery 101-1 is connected to the power supply line 102 is switched to a state where only the battery 101-2 is connected to the power supply line 102 or a state where the battery 101-1 and the battery 101-2 are connected in parallel to the power supply line 102 to start power supply. In the case of the power supply system 10B shown in FIG. 5, in step S2 after step S1, the battery 101-1 is connected to the power supply line 102 and power supply from the battery 101 is started in the hot-swap circuit 121.

After hot-swapping is performed in step S2, processing similar to that described with reference to the flow chart in FIG. 3 is performed. Specifically, charging of the capacitor 103 in accordance with the voltage of the power supply line 102 after the hot-swapping is performed, the discharge-side FET switch 106 is switched from an off-state to an on-state after the charging is completed and the capacitor 103 is connected to the power supply line 102 (step S17), and the capacitor 103 enters a discharge start state (a power suppliable state) (step S18).

In the power supply system 10B shown in FIG. 5, a similar effect to that of the power supply system 10A shown in FIG. 2 can be obtained. In addition, in the power supply system 10B shown in FIG. 5, when hot-swapping is performed, an inrush current (a capacitor charge current) in accordance with a potential difference can be prevented from flowing from the power supply line 102 to the capacitor 103 and occurrences of problems such as generation of sparks, destruction of circuit elements, and instantaneous interruption and/or malfunction of a system as a whole due to detection of an overcurrent of a power supply can be avoided.

3. Third Embodiment

Assistance with power supply by a capacitor is not always necessary in operations of a robot. The capacitor is charged and discharged in accordance with timings which have been calculated by a high-level CPU that governs operations of the robot based on drive schedule information of the robot and at which assistance with power supply becomes necessary. Accordingly, since a capacitor-charging state at a timing where power supply assistance is not required can be avoided, power loss due to leakage of the capacitor can be reduced and a service life of the capacitor itself can be extended.

Configuration Example of Power Supply System

Figure 7:
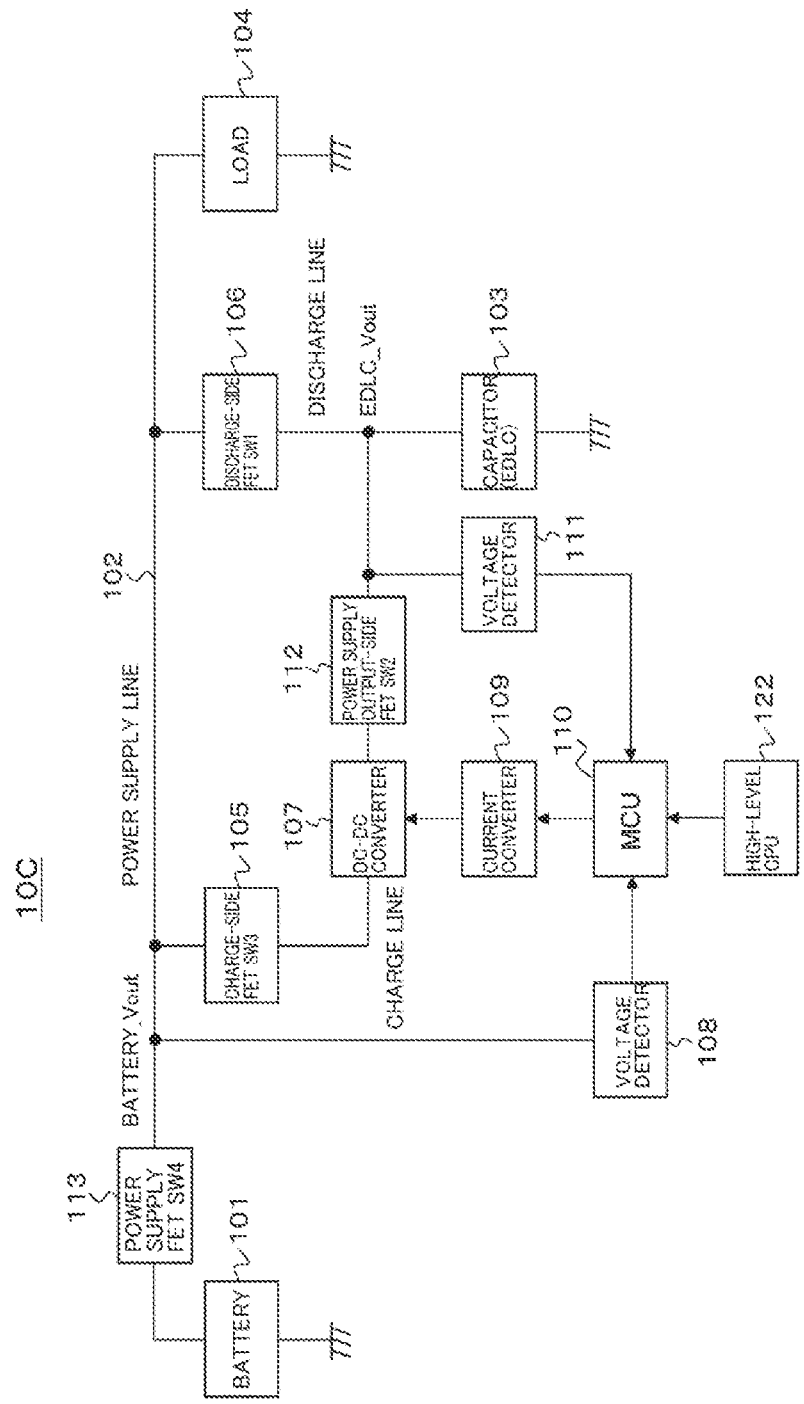
FIG. 7 is a block diagram showing a configuration example of a power supply system as a third embodiment.

FIG. 7 shows a configuration example of a power supply system 10C as a third embodiment. In FIG. 7, the parts corresponding to those in FIG. 2 are designated by the same reference signs, and detailed descriptions thereof will be omitted as appropriate.

A high-level CPU 122 is a main CPU which is configured to control a robot and which determines how each actuator of the robot is to be driven. The high-level CPU 122 predicts necessary power from a drive schedule and calculates a timing at which assistance with power supply becomes necessary and a timing at which assistance with power supply becomes unnecessary. In addition, the high-level CPU 122 notifies the MCU 110 that a timing at which assistance with power supply becomes necessary has arrived or a timing at which assistance with power supply becomes unnecessary has arrived. The MCU 110 performs charge/discharge control of the capacitor 103 in accordance with such timing notifications. Other components are similar to those of the power supply system 10A shown in FIG. 2.

Figure 8:
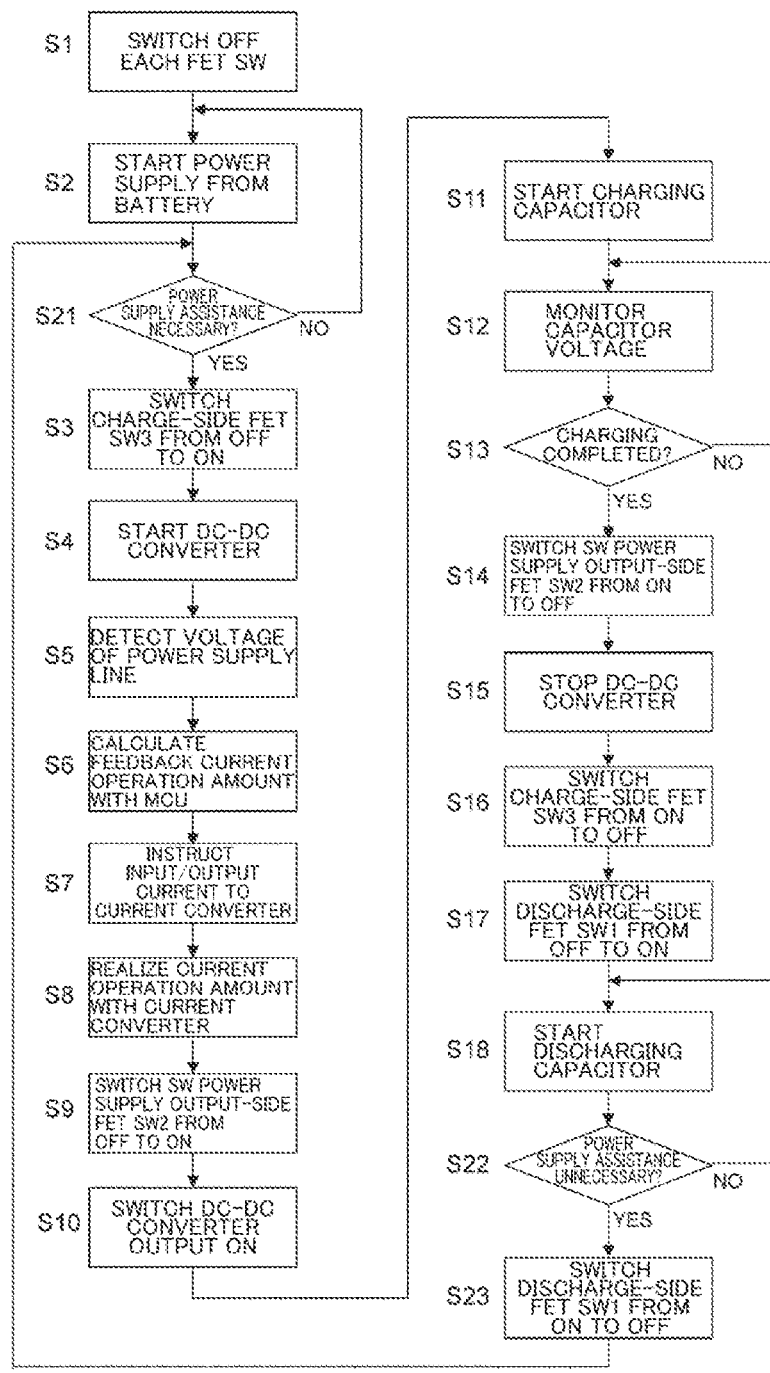
FIG. 8 is a flowchart showing an example of an operation of a power supply system.

The flowchart in FIG. 8 shows an example of an operation of the power supply system 10C shown in FIG. 7. In FIG. 8, steps corresponding to those in the flow chart shown in FIG. 3 are designated by the same reference signs and detailed descriptions thereof will be omitted as appropriate.

After power supply from the battery 101 is started in step ST2, in step S21, the MCU 110 determines whether or not there is a notification that a timing at which assistance with power supply becomes necessary has arrived from the high-level CPU 122. When it is determined that there is no notification, a return is made to the processing of step S2 and power supply by only the battery 101-1 is continued.

On the other hand, when it is determined that there is a notification, the operation advances to processing of step S3 and processing similar to that described with reference to the flow chart shown in FIG. 3 is performed. Specifically, charging of the capacitor 103 in accordance with the voltage of the power supply line 102 is performed, the discharge-side FET switch 106 is switched from an off-state to an on-state after the charging is completed and the capacitor 103 is connected to the power supply line 102 (step S17), and the capacitor 103 enters a discharge start state (a power suppliable state) (step S18).

In addition, after the capacitor 103 enters the discharge-able state (the power suppliable state) in step S18, in step S22, the MCU 110 determines whether or not there is a notification that a timing at which assistance with power supply becomes unnecessary has arrived from the high-level CPU 122. When it is determined that there is no notification, a return is made to step S18 and the power suppliable state (the discharge start state) of the capacitor 103 is continued.

On the other hand, when it is determined that there is a notification, in step S23, the discharge-side FET switch 106 is switched from an on-state to an off-state and the capacitor 103 is disconnected from the power supply line 102. Thereafter, a return is made to the processing of step S21.

In the power supply system 10C shown in FIG. 7, a similar effect to that of the power supply system 10A shown in FIG. 2 can be obtained. In addition, in the power supply system 10C shown in FIG. 7, a capacitor-charging state at a timing where power supply assistance is not required can be avoided, power loss due to leakage of the capacitor 103 can be reduced, and a service life of the capacitor 103 itself can be extended.

4. Fourth Embodiment

When some kind of abnormality occurs in a robot and output of a battery or the like stops, normally, a power supply for operating a microcomputer and the like will be lost (power loss). In such a case, since a capacitor is left in a charged state despite the robot having stopped due to an abnormal operation, a problem of safety and a problem of a reduction of a service life of the capacitor due to the charged state being unintentionally maintained arise.

When some kind of abnormality occurs in the robot, the problem of safety and the problem of reduced service life of the capacitor can be solved by discharging an electric charge of the capacitor. In addition, in this case, by supplying power from a main power supply (a battery) and power from the capacitor in parallel as operating power of an MCU, even when the main power supply is lost, the MCU can be operated by power stored in the capacitor itself and a discharge circuit or the like can be activated.

Configuration Example of Power Supply System

Figure 9:
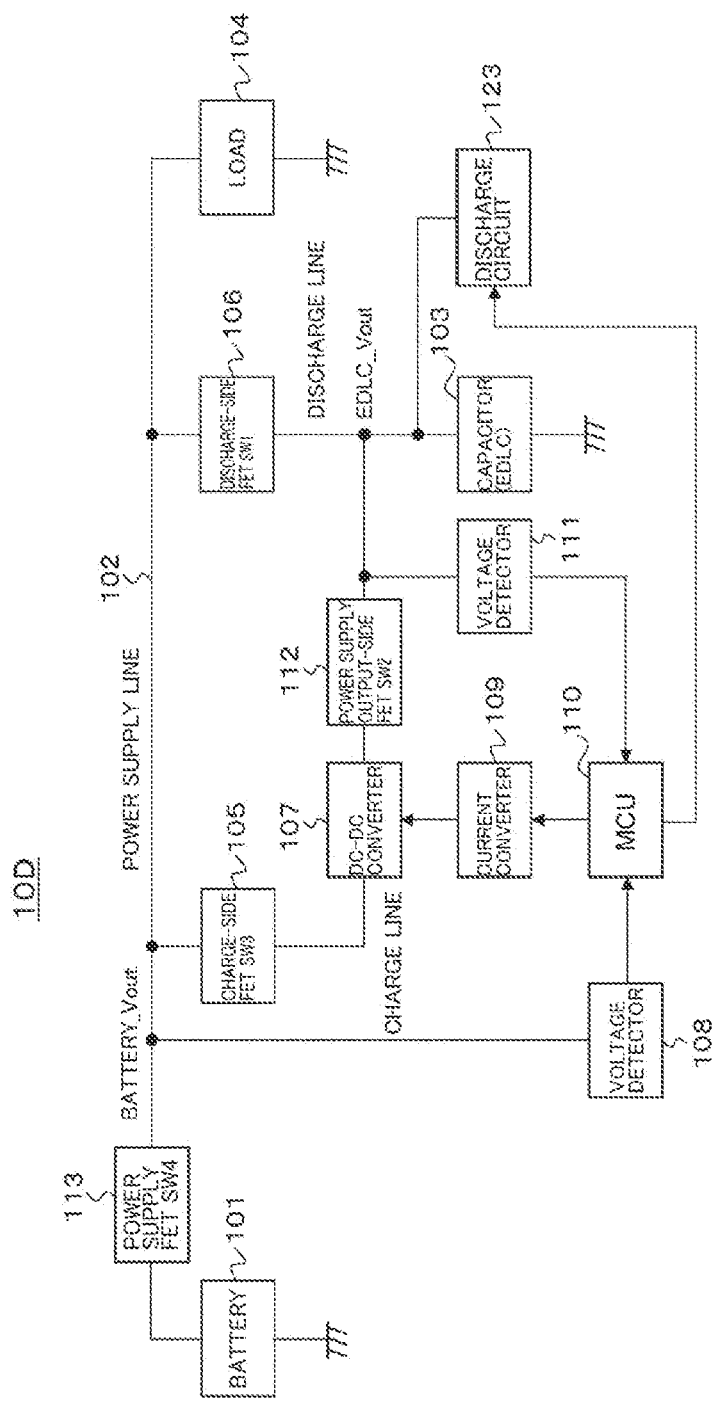
FIG. 9 is a block diagram showing a configuration example of a power supply system as a fourth embodiment.

FIG. 9 shows a configuration example of a power supply system 10D as a fourth embodiment. In FIG. 9, the parts corresponding to those in FIG. 2 are designated by the same reference signs, and detailed descriptions thereof will be omitted as appropriate.

Figure 10:
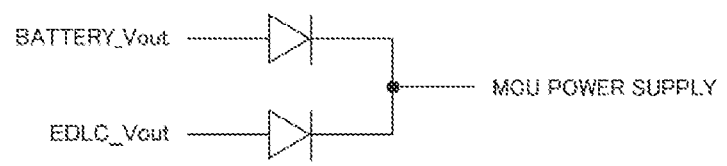
FIG. 10 is a diagram showing power from a battery via a power supply line and power from a capacitor being supplied in parallel as operating power of an MCU.

A discharge circuit 123 is a circuit for discharging an electric charge of the capacitor 103 and is controlled by the MCU 110. The discharge circuit 123 is connected to a discharge line. In addition, as shown in FIG. 10, power from the battery 101 via the power supply line 102 and power from the capacitor 103 are supplied in parallel as operating power of the MCU 110. Other components are similar to those of the power supply system 10A shown in FIG. 2.

Figure 11:
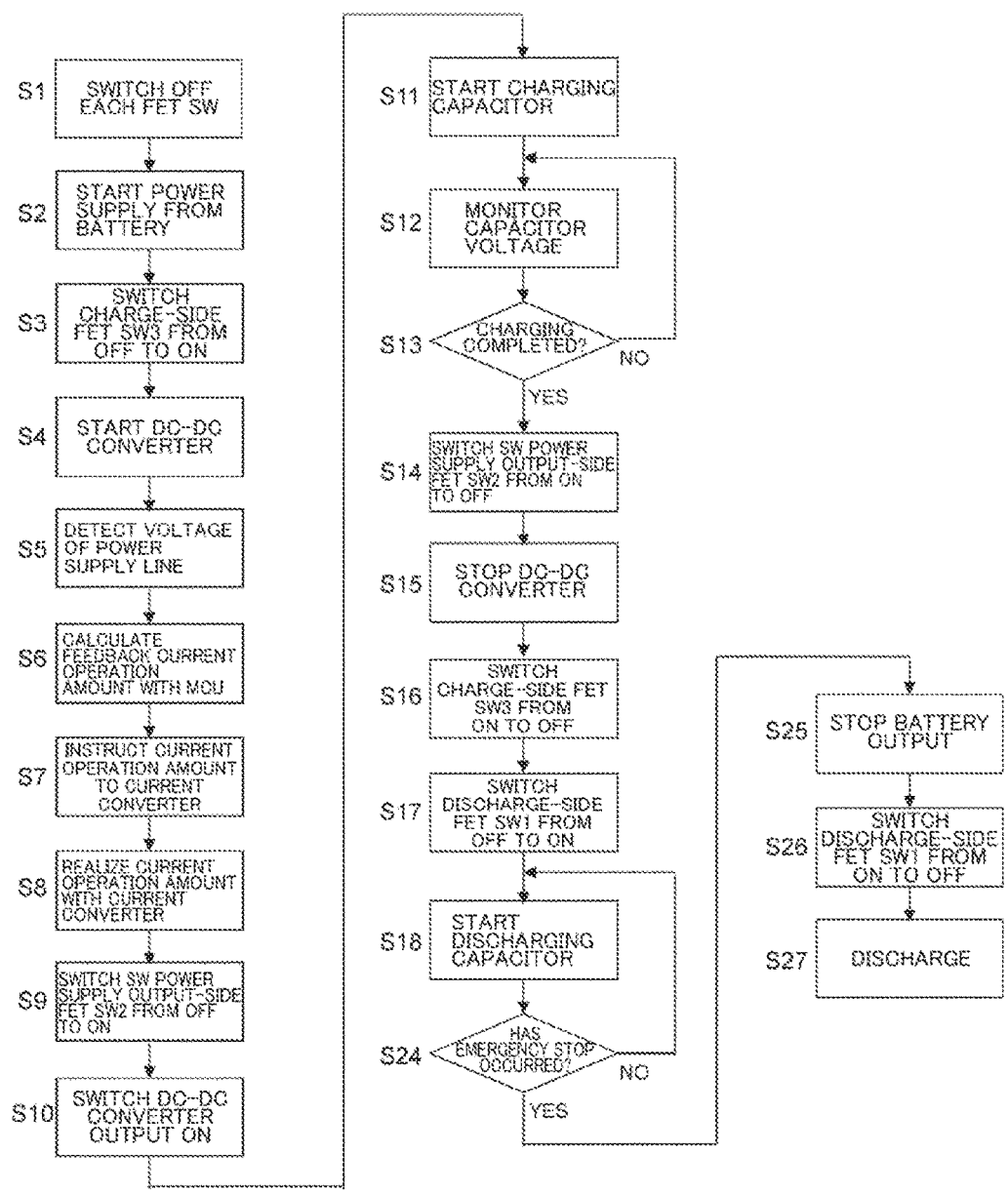
FIG. 11 is a flowchart showing an example of an operation of a power supply system.

The flowchart in FIG. 11 shows an example of an operation of the power supply system 10D shown in FIG. 9. In FIG. 11, steps corresponding to those in the flow chart shown in FIG. 3 are designated by the same reference signs and detailed descriptions thereof will be omitted as appropriate.

After the capacitor 103 enters the dischargeable state (the power suppliable state) in step S18, in step S24, the MCU 110 determines whether or not an emergency stop has occurred. In this case, the MCU 110 makes a determination based on a detection result regarding whether or not some kind of abnormality has occurred in the robot. Usually, a robot is equipped with such a monitoring function as a safety function design of the robot. When it is determined that an emergency stop has not occurred, a return is made to step S18 and the power suppliable state (discharge start state) of the capacitor 103 is maintained.

On the other hand, when it is determined that an emergency stop has occurred, in step S25, battery output is stopped. In other words, the power supply FET switch 113 is switched from an on-state to an off-state and the battery 101 is disconnected from the power supply line 102 and therefore from the load 104. This is done from the perspective of safety given that maintaining conduction of the battery 101 is dangerous. In this manner, even when battery output stops, the MCU 110 is supplied with operating power from the capacitor 103 (refer to FIG. 10) and the MCU 110 continues to operate.

Next, in step S26, the discharge-side FET switch 106 is switched from an on-state to an off-state and the capacitor 103 is disconnected from the power supply line 102 and therefore from the load 104. Subsequently, in step S27, the discharge circuit 123 is driven under control of the MCU 110, an electric charge of the capacitor 103 is discharged, and power of the capacitor 103 is discarded.

In the power supply system 10D shown in FIG. 9, a similar effect to that of the power supply system 10A shown in FIG. 2 can be obtained. In addition, in the power supply system 10D shown in FIG. 9, when some kind of abnormality occurs in the load 104 such as the robot, the battery 101 is disconnected from the load 104, an electric charge of the capacitor 103 is discharged by the discharge circuit 123, safety can be secured, and a reduction of a service life of the capacitor due to the charged state of the capacitor being unintentionally maintained can be avoided.

In addition, in the power supply system 10D shown in FIG. 9, power from the battery 101 via the power supply line 102 and power from the capacitor 103 are supplied in parallel as operating power of the MCU 110, and even when the battery 101 is disconnected from the power supply line 102 and a state of power loss is created, the MCU 110 can activate the discharge circuit 123 and the like using power from the capacitor 103 and discharge the electric charge of the capacitor 103 in a safe manner.

5. Modifications

While examples in which the power supply is a battery have been shown in the embodiments described above, the power supply is not limited to a battery and may be a wired power supply such as a power supply provided via a power cord from an outlet.

Although preferred embodiments of the present disclosure have been described in detail with reference to the accompanying drawings as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

Further, the effects described in the present specification are merely explanatory or exemplary and are not intended as limiting. That is, the techniques according to the present disclosure may exhibit other effects apparent to those skilled in the art from the description herein, in addition to or in place of the above effects.

In addition, the present technique can also adopt the following configurations.

(1) A control apparatus, including:
a control unit configured to control a power system having a configuration in which a power supply is connected to a load via a power supply line, a capacitor for assisting power supply is connected to the power supply line via a first switch, and the capacitor is charged while being subjected to current limitation due to intermittent driving by a switching power supply that uses the power supply as input, wherein
the control unit is configured to perform control so that an output voltage of the switching power supply becomes equal to a voltage of the power supply line and to control the first switch from an off-state to an on-state after charging of the capacitor is completed.

(2) The control apparatus according to (1), wherein
the power system has a second switch between the switching power supply and the capacitor, and
the control unit is configured to control the second switch from an off-state to an on-state when starting charging of the capacitor by the switching power supply and to control the second switch from an on-state to an off-state when charging of the capacitor is completed.

(3) The control apparatus according to (2), wherein
the control unit is configured to, when starting the charging of the capacitor by the switching power supply, control output of the switching power supply from an off-state to an on-state after controlling the second switch from an off-state to an on-state.

(4) The control apparatus according to (2) or (3), wherein
the control unit is configured to, when the charging of the capacitor is completed, control output of the switching power supply from an on-state to an off-state after controlling the second switch from an on-state to an off-state.

(5) The control apparatus according to any one of (1) to (4), wherein
the power system has a first voltage detecting unit configured to detect a voltage of the power supply line, and
the control unit is configured to perform control so that an output voltage of the switching power supply becomes equal to the voltage of the power supply line based on a detection result of the first voltage detecting unit.

(6) The control apparatus according to (5), wherein
the power system has a current converter configured to input or output a current to or from a feedback line of the switching power supply, and
the control unit is configured to calculate a current operation amount of a feedback line of the first switching power supply based on a detection result of the first voltage detecting unit and to instruct the current converter to input or output the current operation amount to or from the feedback line.

(7) The control apparatus according to any one of (1) to (6), wherein
the power system has a second voltage detecting unit configured to detect a charge voltage of the capacitor, and
the control unit is configured to determine that charging of the capacitor has been completed based on a detection result of the second voltage detecting unit.

(8) The control apparatus according to any one of (1) to (7), wherein
the power system has a third switch between the power supply line and the switching power supply, and
the control unit is configured to, when starting charging of the capacitor by the switching power supply, control the third switch from an off-state to an on-state, and when the charging of the capacitor is completed, control the third switch from an on-state to an off-state.

(9) The control apparatus according to any one of (1) to (8), wherein
the power system has a hot-swap circuit configured to perform hot-swapping of switching from a state where a first power supply as the power supply is connected to the power supply line to a state where a second power supply as the power supply is connected to the power supply line or to a state where the first power supply and the second power supply are connected in parallel, and the control unit is configured to,
when hot-swapping is performed with the hot-swap circuit, perform control so that the hot-swap circuit to actually perform hot-swapping after controlling the first switch from an on-state to an off-state, and perform control so that the capacitor to be charged while being subjected to current limitation due to intermittent driving by the switching power supply, and control the first switch from an off-state to an on-state after charging of the capacitor is completed.

(10) The control apparatus according to any one of (1) to (9), wherein
the control unit is configured to
perform control so that the first switch from an on-state to an off-state when the load does not require power supply assistance by the capacitor,
perform control so that the capacitor to be charged while being subjected to current limitation due to intermittent driving by the switching power supply when the load requires power supply assistance by the capacitor, and control the first switch from an off-state to an on-state after charging of the capacitor is completed.

(11) The control apparatus according to any one of (1) to (10), wherein
the power system has a fourth switch configured to connect the power supply to the power supply line and a discharge circuit configured to discharge an electric charge of the capacitor, and
the control unit is configured to, when an abnormality occurs in the load, control the fourth switch from an on-state to an off-state, control the first switch from an on-state to an off-state, and perform control so that the electric charge of the capacitor is discharged by the discharge circuit.

(12) The control apparatus according to (11), wherein
the control unit is supplied power from the power supply via the power supply line and power from the capacitor in parallel.

(13) The control apparatus according to any one of (1) to (12), wherein
the power supply is a battery.

(14) The control apparatus according to any one of (1) to (13), wherein
the capacitor is an EDLC (Electric double-layer capacitor).

(15) The control apparatus according to any one of (1) to (14), wherein
the load includes a motor constituting a robot.

(16) A control method of controlling a power system having a configuration in which a power supply is connected to a load via a power supply line, a capacitor for assisting power supply is connected to the power supply line via a first switch, and the capacitor is charged while being subjected to current limitation due to intermittent driving by a switching power supply that uses the power supply as input, the control method including the steps of:
performing control so that an output voltage of the switching power supply becomes equal to a voltage of the power supply line; and
controlling the first switch from an off-state to an on-state after charging of the capacitor is completed.

REFERENCE SIGNS LIST 10A, 10B, 10C, 10D Power supply system
101, 101-1, 101-2 Battery
102 Power supply line
103 Capacitor
104 Load
105 Charge-side FET switch
106 Discharge-side FET switch
107 DC-DC converter
108 Voltage detector
109 Current converter
110 MCU
111 Voltage detector
112 Switching power supply output-side FET switch 113 Power supply-side FET switch
121 Hot-swap circuit
122 High-level CPU
123 Discharge circuit

The invention claimed is:

1. A control apparatus, comprising:
a control unit configured to;
control a power system that comprises:
a power supply connected to a load via a power supply line;
a capacitor configured to assist the power supply, wherein
the capacitor is connected to the power supply line via a first switch,
the capacitor is configured to be charged based on current limitation due to an intermittent driving operation by a switching power supply, and
the switching power supply is configured to use the power supply as input; and
a second switch between the switching power supply and the capacitor;
control an output voltage of the switching power supply to become equal to a voltage of the power supply line;
control the first switch from an off-state of the first switch to an on-state of the first switch after completion of a charging operation of the capacitor;
control the second switch from an off-state of the second switch to an on-state of the second switch based on start of the charging operation of the capacitor;
control the second switch from the on-state of the second switch to the off-state of the second switch based on the completion of the charging operation of the capacitor; and
based on the completion of the charging operation of the capacitor, control output of the switching power supply from an on-state to an off-state after the second switch is controlled from the on-state of the second switch to the off-state of the second switch.

2. The control apparatus according to claim 1, wherein the control unit is further configured to
based on the start of the charging operation of the capacitor by the switching power supply, control the output of the switching power supply from the off-state to the on-state after the second switch is controlled from the off-state of the second switch to the on-state of the second switch.

3. The control apparatus according to claim 1, wherein the power system further includes a first voltage detecting unit configured to detect the voltage of the power supply line, and
the control unit is further configured to control the output voltage of the switching power supply to become equal to the voltage of the power supply line based on a first detection result of the first voltage detecting unit.

4. The control apparatus according to claim 3, wherein the power system further includes a current converter configured to;
input a current to a feedback line of the switching power supply; and
output the current from the feedback line of the switching power supply, and
the control unit is further configured to;
calculate a current operation amount of the feedback line of the switching power supply based on the first detection result of the first voltage detecting unit;
instruct the current converter to input the current operation amount to the feedback line; and
instruct the current converter to output the current operation amount from the feedback line.

5. The control apparatus according to claim 1, wherein the power system further includes a second voltage detecting unit configured to detect a charge voltage of the capacitor, and
the control unit is further configured to determine, based on a second detection result of the second voltage detecting unit, the completion of the charging operation of the capacitor.

6. The control apparatus according to claim 1, wherein the power system further includes a third switch between the power supply line and the switching power supply, and
the control unit is further configured to;
based on the start of the charging operation of the capacitor by the switching power supply, control the third switch from an off-state of the third switch to an on-state of the third switch; and
based on the completion of the charging operation of the capacitor, control the third switch from the on-state of the third switch to the off-state of the third switch.

7. The control apparatus according to claim 1, wherein the power system further includes a hot-swap circuit configured to perform hot-swapping operation to switch from a first state where a first power supply as the power supply is connected to the power supply line to a second state where a second power supply as the power supply is connected to the power supply line or to a third state where the first power supply and the second power supply are connected in parallel, and
the control unit is further configured to;
control the hot-swap circuit to perform the hot-swapping operation after the first switch is controlled from the on-state of the first switch to the off-state of the first switch;
control the capacitor to be charged; and
control the first switch from the off-state of the first switch to the on-state of the first switch after the completion of the charging operation of the capacitor.

8. The control apparatus according to claim 1, wherein the control unit is further configured to:
control the first switch from the on-state of the first switch to the off-state of the first switch in a case where the load does not require assistance by the capacitor;
control the capacitor to be charged in a case where the load requires the assistance by the capacitor; and
control the first switch from the off-state of the first switch to the on-state of the first switch after the completion of the charging operation of the capacitor.

9. The control apparatus according to claim 1, wherein the power system further includes:
a fourth switch configured to connect the power supply to the power supply line; and
a discharge circuit configured to discharge an electric charge of the capacitor, and
the control unit is further configured to;
based on occurrence of an abnormality in the load, control the fourth switch from an on-state of the fourth switch to an off-state of the fourth switch and control the first switch from the on-state of the first switch to the off-state of the first switch; and control the electric charge of the capacitor to be discharged by the discharge circuit.

10. The control apparatus according to claim 9, wherein the control unit is further configured to be supplied power from the power supply via the power supply line and power from the capacitor in parallel.

11. The control apparatus according to claim 1, wherein the power supply is a battery.

12. The control apparatus according to claim 1, wherein the capacitor is an EDLC (Electric double-layer capacitor).

13. The control apparatus according to claim 1, wherein the load includes a motor constituting a robot.

14. A control method of controlling a power system the control method comprising:
- controlling an output voltage of a switching power supply of the power system to become equal to a voltage of a power supply line of the power system, wherein the power system comprises:
  - a power supply connected to a load via the power supply line;
  - a capacitor configured to assist the power supply, wherein
    - the capacitor is connected to the power supply line via a first switch, and
    - the capacitor is configured to be charged based on current limitation due to an intermittent driving operation by the switching power supply that uses the power supply as input; and
  - a second switch between the switching power supply and the capacitor;
- controlling the first switch from an off-state of the first switch to an on-state of the first switch after completion of a charging operation of the capacitor;
- controlling the second switch from an off-state of the second switch to an on-state of the second switch based on start of the charging operation of the capacitor by the switching power supply;
- controlling the second switch from the on-state of the second switch to the off-state of the second switch based on the completion of the charging operation of the capacitor; and
- based on the completion of the charging operation of the capacitor, controlling output of the switching power supply from an on-state to an off-state after the second switch is controlled from the on-state of the second switch to the off-state of the second switch.

* * * * *